(12) United States Patent
Jung et al.

(10) Patent No.: US 12,263,772 B2
(45) Date of Patent: Apr. 1, 2025

(54) REFRIGERATOR FOR VEHICLE AND VEHICLE

(71) Applicant: LG ELECTRONICS INC., Seoul (KR)

(72) Inventors: Wonyeong Jung, Seoul (KR); Daewoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/642,361

(22) Filed: Apr. 22, 2024

(65) Prior Publication Data

US 2024/0270143 A1 Aug. 15, 2024

Related U.S. Application Data

(63) Continuation of application No. 18/089,882, filed on Dec. 28, 2022, now Pat. No. 11,993,191, which is a
(Continued)

(30) Foreign Application Priority Data

Feb. 2, 2017 (KR) .................. 10-2017-0014982

(51) Int. Cl.
*B60N 3/10* (2006.01)
*B60H 1/00* (2006.01)
(Continued)

(52) U.S. Cl.
CPC ......... *B60N 3/104* (2013.01); *B60H 1/00592* (2013.01); *B60R 7/04* (2013.01); *F25D 23/026* (2013.01); *F25D 23/028* (2013.01)

(58) Field of Classification Search
CPC ...... F25D 23/02; F25D 23/026; F25D 23/028; F25D 23/10; F25D 2201/14;
(Continued)

(56) References Cited

U.S. PATENT DOCUMENTS 3,858,405 A 1/1975 Manzke
4,545,213 A 10/1985 Fujiwara
(Continued)

FOREIGN PATENT DOCUMENTS

CN 2691933 4/2005
CN 1995877 7/2007
(Continued)

OTHER PUBLICATIONS

International Search Report and Written Opinion dated Jun. 5, 2018 issued in Application No. PCT/KR2018/001387.
(Continued)

*Primary Examiner* — Joseph F Trpisovsky
(74) *Attorney, Agent, or Firm* — KED & ASSOCIATES, LLP

(57) ABSTRACT

Provided is a refrigerating or warming apparatus. The refrigerating or warming apparatus include a cavity of which at least a portion of a wall is provided as a vacuum adiabatic body, a machine room disposed at a side outside the cavity, a compressor accommodated in the machine room to compress a refrigerator, a first heat exchange module accommodated in the machine room to allow the refrigerant to be heat-exchanged, a second heat exchange module accommodated in the cavity to allow the refrigerant to be heat-exchanged, and a machine room cover which covers the machine room to separate a passage and in which an internal air flow and an external air flow have directions opposite to each other.

17 Claims, 13 Drawing Sheets

Related U.S. Application Data continuation of application No. 16/482,393, filed as application No. PCT/KR2018/001387 on Feb. 1, 2018, now Pat. No. 11,572,003.

(51) Int. Cl.
 *B60R 7/04* (2006.01)
 *F25D 23/02* (2006.01)

(58) Field of Classification Search
 CPC ......... F25D 11/003; B60N 3/10; B60N 3/104; B60H 1/00592; B60H 1/32; B60H 1/3204; B60R 7/04
 See application file for complete search history.

(56) References Cited

U.S. PATENT DOCUMENTS

| | | | |
|---|---|---|---|
| 4,637,222 A | 1/1987 | Fujiwara et al. | |
| 4,917,256 A | 4/1990 | Kruck | |
| 5,168,718 A | 12/1992 | Bergmann | |
| 6,192,703 B1 | 2/2001 | Slayer | |
| 6,973,799 B2 | 12/2005 | Kuehl et al. | |
| 7,029,048 B1 | 4/2006 | Hicks | |
| 9,134,053 B2 | 9/2015 | Lu | |
| 9,327,577 B2 | 5/2016 | Lombardo et al. | |
| 2004/0211211 A1* | 10/2004 | Nam | E05F 1/14 16/284 |
| 2007/0089273 A1 | 4/2007 | Kang | |
| 2007/0180853 A1 | 8/2007 | Lim et al. | |
| 2009/0058120 A1 | 3/2009 | Ioka et al. | |
| 2012/0104923 A1 | 5/2012 | Jung | |
| 2013/0047630 A1 | 2/2013 | Lu | |

FOREIGN PATENT DOCUMENTS

| | | |
|---|---|---|
| CN | 101376357 | 3/2009 |
| CN | 202 304 182 | 7/2012 |
| CN | 103765128 | 4/2014 |
| DE | 4031029 | 4/1992 |
| DE | 299 10 901 | 8/1999 |
| EP | 2 326 894 | 3/2013 |
| JP | 53-103972 | 8/1978 |
| JP | 2003279218 A * | 10/2003 |
| JP | 2004144397 A * | 5/2004 |
| JP | 2014-129876 | 2/2013 |
| KR | 10-2003-0000292 | 1/2003 |
| KR | 10-0428504 | 4/2004 |
| RU | 16715 | 2/2001 |

OTHER PUBLICATIONS

Indian Examination Report dated Aug. 5, 2020 issued in Application No. 201917030957.
Australian Examination Report dated Aug. 10, 2020 issued in Application No. 2018215766.
Russian Search Report dated Jun. 1, 2020 issued in Application No. 2019127179 (English translation attached).
Russian Office Action dated Jun. 1, 2020 issued in Application No. 2019127179.
European Search Report issued in Application No. 18747553.8 dated Oct. 30, 2020.
Chinese Office Action issued in Application No. 2021052801303600 dated Jun. 2, 2021.
Machine translation of DE29910901 (Year: 1999).
U.S. Office Action dated Sep. 25, 2023 issued in U.S. Appl. No. 18/089,882.
U.S. Office Action dated Jan. 25, 2024 issued in U.S. Appl. No. 18/089,882.

\* cited by examiner (a)

(b)

REFRIGERATOR FOR VEHICLE AND VEHICLE

CROSS-REFERENCE TO RELATED PATENT APPLICATIONS

This application is a continuation of U.S. patent application Ser. No. 18/089,882, filed Dec. 28, 2022, which is a continuation of U.S. patent application Ser. No. 16/482,393, filed Jul. 31, 2019, now U.S. Pat. No. 11,572,003, issued on Feb. 7, 2023, which is a U.S. National Stage Application under 35 U.S.C. § 371 of PCT Application No. PCT/KR2018/001387, filed Feb. 1, 2018, which claims priority to Korean Patent Application No. 10-2017-0014982, filed Feb. 2, 2017, whose entire disclosures are hereby incorporated by reference.

1. FIELD

The present disclosure relates to a refrigerator for a vehicle and a vehicle.

2. BACKGROUND

Refrigerators are apparatuses for storing products such as foods received in the refrigerator at a low temperature including sub-zero temperatures. As a result of this action, there is an advantage that a user's access or intake with respect to the products may be improved, or a storage period of the products may be lengthened.

Refrigerators are classified into indoor refrigerators using a commercial power source or outdoor refrigerators using a portable power source. In addition, in recent years, a refrigerator for a vehicle, which is used after it is fixedly mounted on the vehicle, is increasing in supply. The refrigerator for the vehicle is further increasing in demand due to an increase in supply of vehicles and an increase in premium-class vehicles.

A conventional configuration of the refrigerator for the vehicle will be described.

First, there is an example in which heat in the refrigerator is forcibly discharged to an outside of the refrigerator by using a thermoelement. However, there is a limitation in that a cooling rate is slow due to low thermal efficiency of the thermoelement, which may deteriorate user's satisfaction.

For another example, there is an example in which a refrigerant or cold air is drawn from an air conditioning system installed for air-conditioning an entire interior of the vehicle and used as a cooling source for the refrigerator for the vehicle.

In this example, there is a disadvantage that a separate flow path of air or refrigerant is required to draw the air or refrigerator from the air conditioning system of the vehicle. Also, there is a limitation that low-temperature energy is lost during the movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied.

In this example, since a part constituting the refrigeration cycle is large in size, most of the parts are mounted on a trunk, and only a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo that is capable of being loaded in the trunk.

DISCLOSURE

Technical Problem

Embodiments also provide a vehicle refrigerator to which a driver is directly accessible while using refrigeration cycle, and a vehicle.

Embodiments also provide a vehicle refrigerator that is capable of increasing a capacity of the refrigerator, and a vehicle.

Embodiments also provide a vehicle refrigerator that is capable of solving a limitation in which products accommodated in the refrigerator is slowly cooled, and a vehicle.

Embodiments provide a vehicle refrigerator that is capable of improving energy efficiency, and a vehicle.

Embodiments also provide a vehicle refrigerator that is capable of blocking an access of foreign substances, and a vehicle.

Technical Solution

In one embodiment, a refrigerator for a vehicle includes a machine room disposed at a side of a cavity or a compartment, a compressor accommodated in the machine room to compress a refrigerant, a condensation module or assembly accommodated in the machine room to condense the refrigerant, an evaporation module or assembly accommodated in the cavity to evaporate the refrigerant and thereby to cool the cavity, and a hinge part adiabatic member or an adiabatic hinge support covering an upper end of the cavity and an upper end of the evaporation module and supporting a hinge shaft or hinge pins of the door. According to the embodiments, the vehicle refrigerator in which high-efficiency refrigeration cycle is compact may be provided.

The refrigerator may further include a conduit connecting the evaporation module to an expansion valve to pass over a wall of the cavity to realize high adiabatic performance without adiabatic loss of the cavity. The refrigerator may further include at least two refrigerant conduits provided in the conduit and heat-exchanged, a regeneration adiabatic member surrounding the at least two refrigerant conduits, and a regeneration adiabatic member seating part or a seating insert disposed on the hinge part adiabatic member to surround the regeneration adiabatic member, thereby further reducing the adiabatic loss.

The hinge part adiabatic member may extend up to the outside over the opened surface of the cavity as well as a corner of one side of the cavity to improve alignment with other parts, prevent foreign substances from being introduced, and further reduce the adiabatic loss.

The hinge part adiabatic member may include an inner support and an outer support, which protrude upward both sides, which are spaced apart from each other, of the hinge part adiabatic member to support the hinge shaft of the door and may support the door.

The refrigerator may further include a connection bar connecting the inner support to the outer support to thermally insulate an entire corner of the one side of the cavity.

The evaporation module may come into contact with a bottom surface of the connection bar to improve the alignment between the parts and further reduce the adiabatic loss.

The cavity may be provided as a vacuum adiabatic body that is opened upward to improve the adiabatic performance by more utilizing the narrow inner space of the vehicle.

The hinge part adiabatic member may further include a fitting part or a seal sealed to correspond to an inner surface of the cavity to completely realize sealing of the cavity, thereby improving the adiabatic performance.

The refrigerator may further include a console cover or a cover covering an upper edge of a main body together with the hinge part adiabatic member to shield an opened surface of the refrigerator disposed in the console space of the vehicle.

At least a portion of the hinge part adiabatic member may be inserted into the console cover, and a bearing part or a bearing supporting the hinge shaft of the door may be disposed on the console cover to provide a door hinge structure to which two parts are applied together, thereby more stably performing the hinge action of the door.

In another embodiment, a vehicle includes a console having a console space therein, a console cover covering an upper portion of the console, a suction port disposed on one side of first and second (e.g., left and right) sides of the console, an exhaust port or an exhaust and getter port disposed on the other side of the left and right sides of the console, a refrigerator bottom frame disposed on a lower portion of an inner space of the console, a cavity provided at a side on the refrigerator bottom frame, which faces the suction port, to accommodate a product, and a machine room provided at a side on the refrigerator bottom frame, which faces the exhaust port so that an air conditioning system is provided in the narrow inner space of the vehicle.

The air conditioning system may include a compressor disposed at a front side of the machine room to compress a refrigerant, a condensation module disposed at a rear side to condense the refrigerant, and an evaporation module disposed in the cavity to evaporate the refrigerant so that a refrigeration system is realized.

A hinge part adiabatic member interposed between the evaporation module and the console cover to support the hinge of the door may be provided to perform the heat insulation with respect to one corner of the cavity and support the hinge of the door.

The vehicle may further include a bearing part disposed on the console cover and a support disposed on the hinge part adiabatic member and inserted into the bearing part to more stably perform the operations of supporting the door and opening the door.

The bearing part and the support may be disposed one by one at inner and outer sides, respectively to open the door in front and rear direction of the vehicle.

A fitting groove reinforcing and supporting the hinge shaft of the door may be defined in the support to more stably perform the opening of the door.

The hinge part adiabatic member may further extend to an outer space of the cavity to more improve the adiabatic performance.

In further another embodiment, a refrigerator for a vehicle includes a cavity having an opened upper side to accommodate a product, a door opening/closing a top surface or top opening of the cavity, a machine room spaced apart from the cavity, a hinge part adiabatic member covering at least a portion of an upper end of the cavity and supporting the door, and a console cover disposed above the cavity to cover an upper edge of the cavity and the hinge part adiabatic member to more stably support the door.

The vehicle may further include a bearing part disposed on the console cover of the door to support the hinge shaft of the door and a support disposed on the hinge part adiabatic member and inserted into the bearing part to reinforce supporting force of the door to draw the support action through interlocking between the two members, thereby stably supporting the door.

The evaporation module may have a top surface coming into contact with a bottom surface of the hinge part adiabatic member to improve reliability with respect to sealing between the adjacent parts.

The hinge part adiabatic member may further protrude to the outside of the cavity to perform the heat insulation between the external parts of the cavity so that the refrigerator is more compact.

Advantageous Effects

The adiabatic performance with respect to the inside of the cavity of the vehicle refrigerator using the vacuum adiabatic body according to an embodiment may be improved.

DETAILED DESCRIPTION

Figure 1:
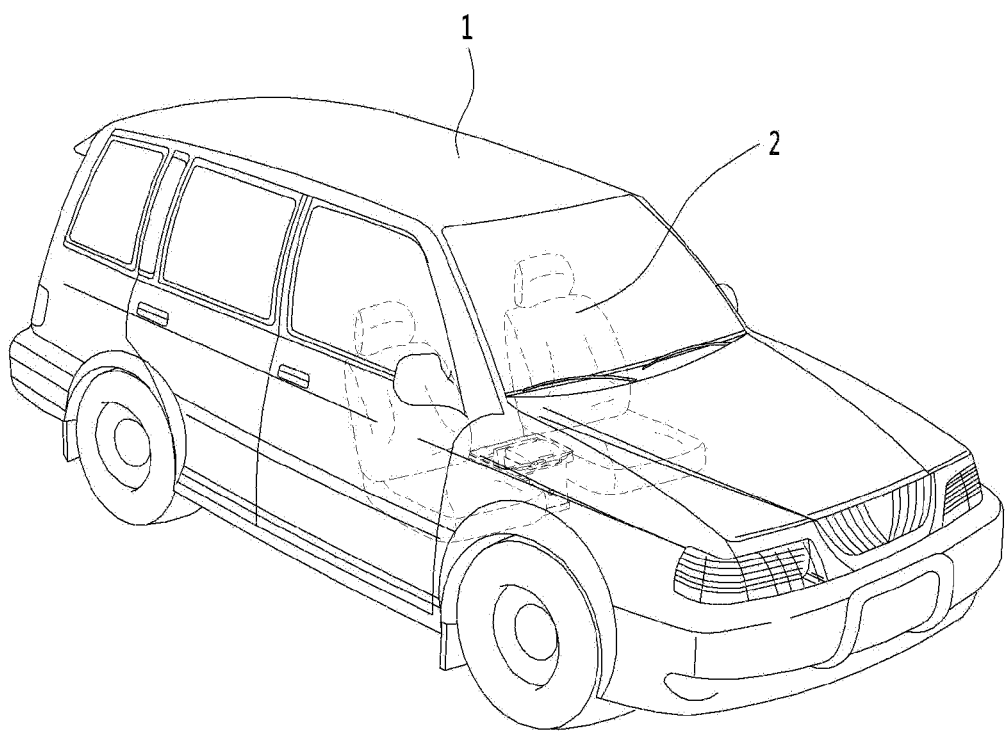
FIG. 1 is a perspective view of a vehicle according to an embodiment.

In the following description according to embodiments with reference to the drawings, the same reference numerals are given to different drawings in the case of the same constituents.

Also, in the description of each drawing, the description will be made with reference to the direction in which the vehicle is viewed from the front of the vehicle, rather than the front viewed by the driver based on the traveling direction of the vehicle. For example, the driver is on the right, and the assistant driver or passenger is on the left.

FIG. 1 is a perspective view of a vehicle according to an embodiment.

Referring to FIG. 1, a seat 2 on which a user is seated is provided in a vehicle 1. The seat 2 may be provided in a pair to be horizontally spaced apart from each other. A console is provided between the seats 2, and a driver places items that are necessary for driving or components that are necessary for manipulating the vehicle in the console. Front seats on which the driver and the assistant driver or passenger are seated may be described as an example of the seats 2.

It should be understood that the vehicle includes various components, which are necessary for driving the vehicle, such as a moving device such as a wheel, a driving device such as an engine, and a steering device such as a steering wheel.

The refrigerator for the vehicle according to an embodiment may be preferably placed in the console. However, an embodiment of the present disclosure is not limited thereto. For example, the vehicle refrigerator may be installed in various spaces. For example, the vehicle refrigerator may be installed in a space between rear seats, a door, a glove box, and a center fascia. This is one of factors that the vehicle refrigerator according to an embodiment is capable of being installed only when power is supplied, and a minimum space is secured. However, it is a great advantage of the embodiment in that it may be installed in the console between the seats, which is limited in space due to limitations in vehicle design.

Figure 2:
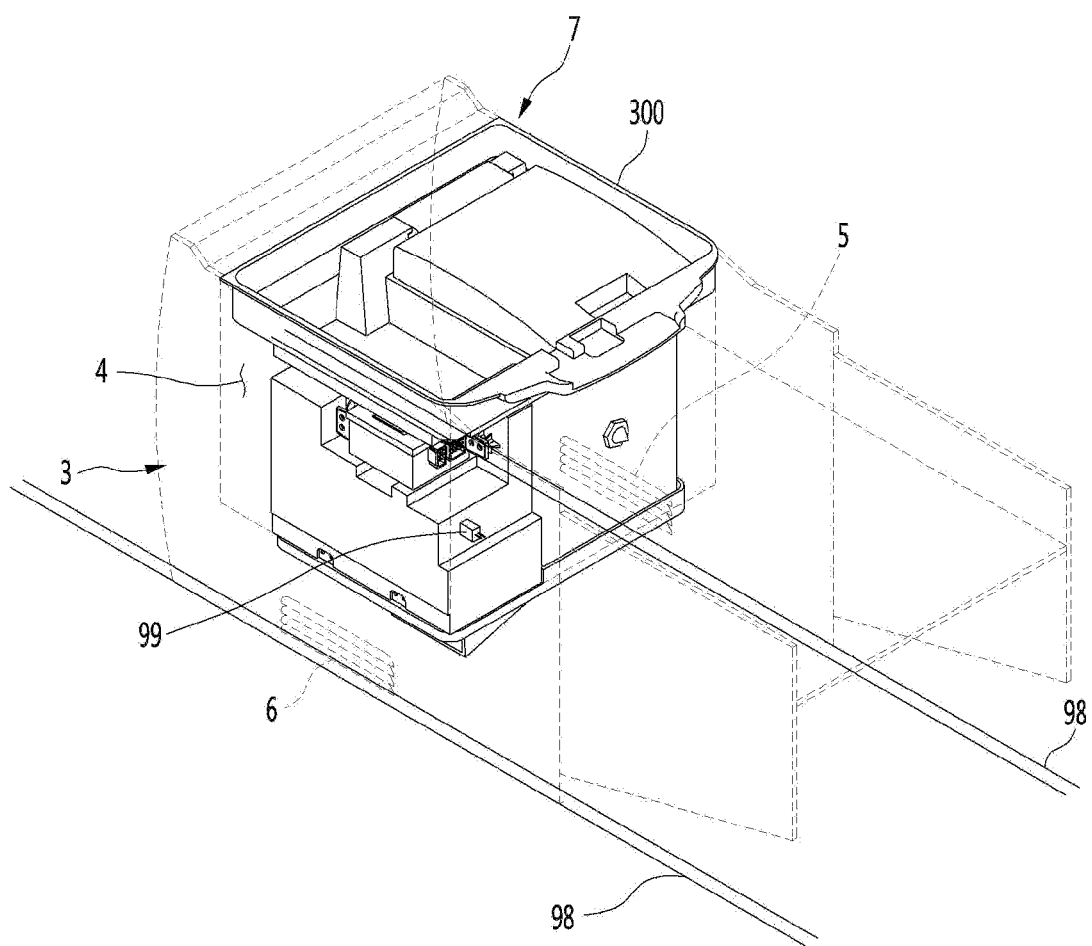
FIG. 2 is an enlarged perspective view illustrating a console of the vehicle.

FIG. 2 is an enlarged perspective view illustrating the console of the vehicle.

Referring to FIG. 2, a console 3 may be provided as a separate part that is made of a material such as a resin. A steel frame 98 may be further provided below the console 3 to maintain strength of the vehicle, and a sensor part 99 such as a sensor may be provided in a spacing part between the console 3 and the steel frame 98. The sensor part 99 may be a part that is necessary for accurately sensing an external signal and measuring a signal at a position of the driver. For example, an airbag sensor that directly impacts the life of the driver may be mounted.

The console 3 may have a console space 4 therein, and the console space 4 may be covered by a console cover or a cover 300. The console cover 300 may be fixed to the console 3 in a fixed type. Thus, it is difficult for external foreign substances to be introduced into the console through the console cover 300. A vehicle refrigerator 7 is seated in the console space 4.

A suction port 5 may be provided in a first or right surface of the console 3 to introduce air within the vehicle into the console space 4. The suction port 5 may face the driver. An exhaust port 6 may be provided in a second or left surface of the console 3 to exhaust warmed air while the vehicle refrigerator operates from the inside of the console space 4. The exhaust port 6 may face the assistant driver or passenger. A grill may be provided in each of the suction port 5 and the exhaust port 6 to prevent a user's hand from being inserted and thereby to provide safety, prevent a falling object from being introduced, and allow air to be exhausted to flow downward so as not to be directed to the person.

Figure 3:
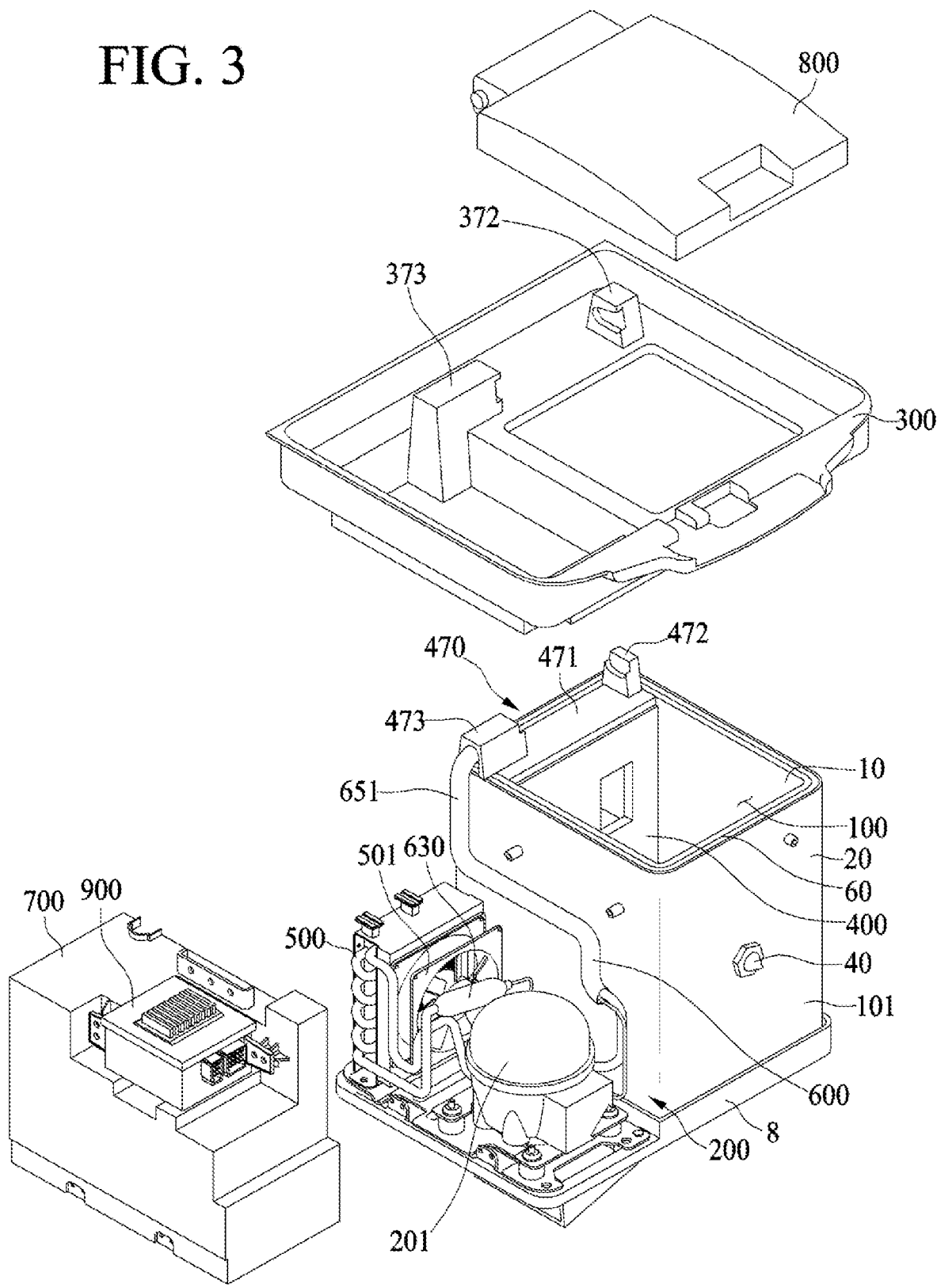
FIG. 3 is a schematic perspective view illustrating the inside of a vehicle refrigerator.

FIG. 3 is a schematic perspective view illustrating the inside of the vehicle refrigerator.

Referring to FIG. 3, the vehicle refrigerator 7 includes a refrigerator bottom frame or a refrigerator base 8 supporting parts, a machine room 200 provided in a left side of the refrigerator bottom frame 8, and a cavity or compartment 100 provided in a right side of the refrigerator bottom frame 8. The machine room 200 may be covered by a machine room cover 700, and an upper side of the cavity 100 may be covered by the console cover 300 and a door 800.

The machine room cover 700 may not only guide a passage of the cooling air, but also prevent foreign substances from being introduced into the machine room 200.

A controller 900 may be disposed on the machine room cover 700 to control an overall operation of the vehicle refrigerator 7. Since the controller 900 is installed at the above-described position, the vehicle refrigerator 7 may operate without problems in a proper temperature range in a narrow space inside the console space 4. That is to say, the controller 900 may be cooled by air flowing through a gap between the machine room cover 700 and the console cover 300 and separated from an inner space of the machine room 200 by the machine room cover 700. Thus, the controller 900 may not be affected by heat within the machine room 200.

The console cover 300 may not only cover an opened upper portion or top of the console space 4, but also cover an upper end edge of the cavity 100. A door 800 may be further installed on the console cover 300 to allow the user to cover an opening through which products are accessible to the cavity 100. The door 800 may be opened by using rear portions of the console cover 300 and the cavity 100 as hinge points. Here, the opening of the console cover 300, the door 800, and the cavity 100 may be performed by conveniently manipulating the door 800 by the user because the console cover 300, the door 800, and the cavity 100 are horizontally provided when viewed from the user and also disposed at a rear side of the console.

A condensation module or assembly 500, a dryer 630, and a compressor 201 may be successively installed on a base 210 in the machine room 200 in a flow direction of the cooling air. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are accessible to the cavity 100. The condensation module 500 may include a condensation fan 501 and a condenser.

The cavity 100 has an opened top surface or a top opening and five surfaces that are covered by a vacuum adiabatic body 101.

The vacuum adiabatic body 101 may include a first plate member 10 providing a boundary of a low-temperature inner space of the cavity 100, a second plate member 20 providing a boundary of a high-temperature outer space, and a conductive resistance sheet 60 blocking heat transfer between the plate members 10 and 20. Since the vacuum adiabatic body 101 has a thin adiabatic thickness to maximally obtain adiabatic efficiency, a large capacity of the cavity 100 may be realized.

An exhaust and getter port or an exhaust port 40 for exhaust of the inner space of the vacuum adiabatic body 101 and for installing a getter that maintains the vacuum state may be provided on one surface. The exhaust and getter port 40 may provide an exhaust and getter together to better contribute to miniaturization of the vehicle refrigerator 7.

An evaporation module or assembly 400 may be installed in the cavity 100. The evaporation module 400 may forcibly blow evaporation heat of the refrigerant, which is introduced into the cavity 100 through the refrigerant conduit 600, and forcibly blow cold air, into the cavity 100. The evaporation module may be provided at a rear side within the cavity 100.

Figure 4:
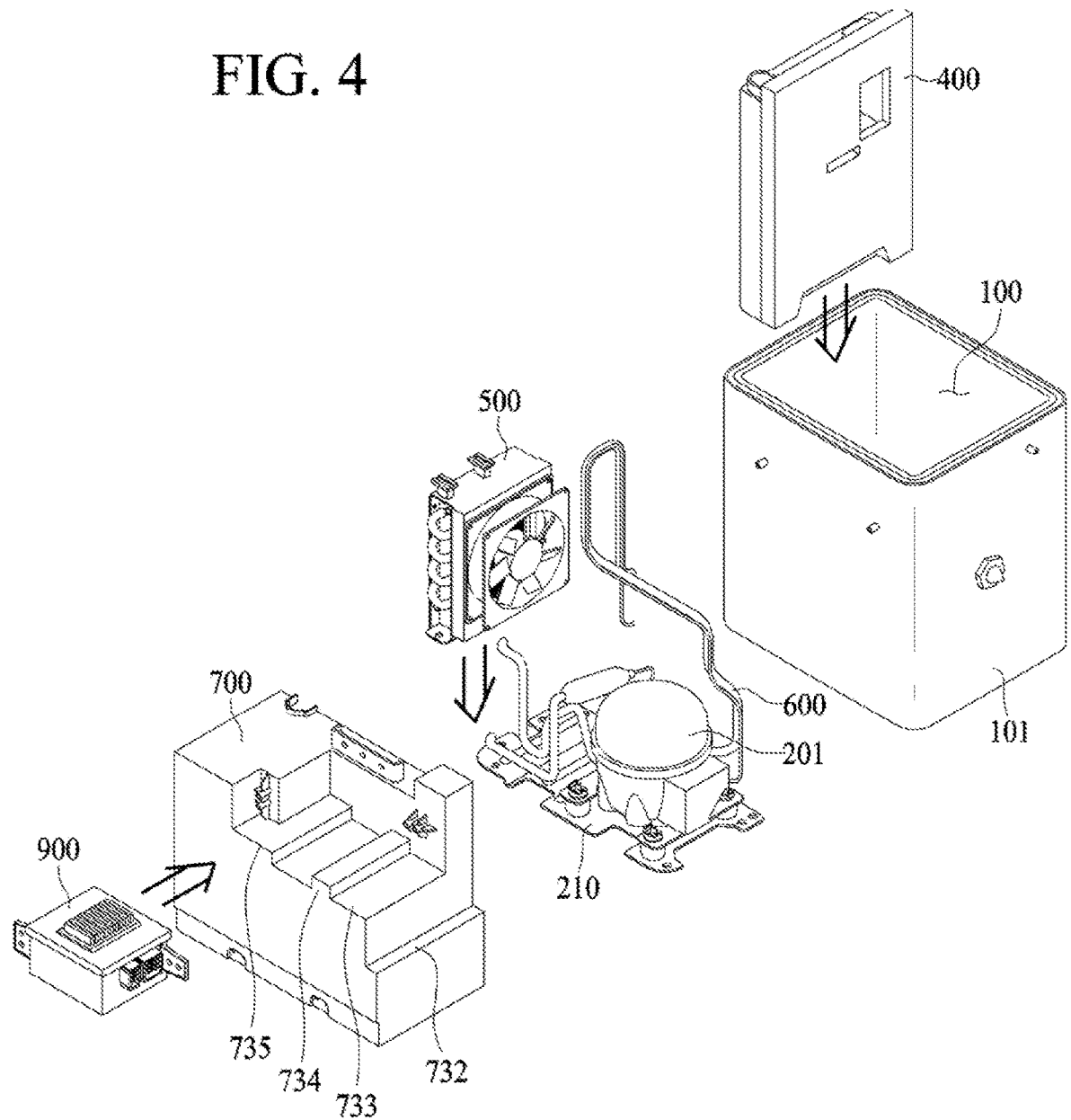
FIG. 4 is a view for explaining an air flow outside a machine room of the vehicle refrigerator.

FIG. 4 is a view for explaining an air flow outside a machine room of the vehicle refrigerator.

Referring to FIG. 4, air introduced into the suction port 5 moves to a left side of the vehicle refrigerator through a space between the vacuum adiabatic body 101 defining a front wall of the cavity 100 and a front surface of the console space 4. Since a heating source is not provided at a right side of the vehicle refrigerator, the suction air may be maintained at its original temperature.

The air moving to the left side of the vehicle refrigerator may be changed in direction to a rear side to move along a top surface of the machine room cover 700 outside the machine room 200.

To smoothly guide the air flow, the machine room cover 700 may have a height that gradually increases backward from a front surface 710. Also, to provide a region in which the controller 900 is disposed, and prevent the parts within the machine room 200 from interfering in position with each other, a stepped part may be disposed on a top surface of the machine room cover 700.

In detail, a first step portion 732, a second stepped part 733, and a third stepped part 735 may be successively provided backward from the front surface. A controller placing part 734 having the same height as the third stepped part is disposed on the second stepped part 733. Due to this structure, the controller 900 may be disposed in parallel to the third stepped part 735 and the controller placing part 734.

The air moving along the top surface of the machine room cover 700 may cool the controller 900. When the controller is cooled, the air may be slightly heated.

The air moving up to a rear side of the machine room cover 700 flows downward. An opened large cover suction hole is defined in the rear surface of the machine room cover 700. For this, a predetermined space may be provided between a rear surface of the machine room cover 700 and a rear surface of the console space 4.

The evaporation module 400 is disposed at a rear side of the cavity 100, and the refrigerant conduit 600 supplying the refrigerant into the evaporation module 400 passes over the cavity 100. In addition, a hinge of the door 800 and the evaporation module 400 are placed on the rear side of the cavity so that a rear portion of the cavity is vulnerable to heat insulation.

To solve this limitation, a hinge part adiabatic member or an adiabatic hinge support 470 is provided. The hinge part adiabatic member 470 may also be referred to as an adiabatic door support. The hinge part adiabatic member 470 performs an adiabatic action on an upper portion of the evaporation module 400, between the evaporation module 400 and a rear wall of the cavity 100, and a contact part between a regeneration adiabatic member 651 inserted into the cavity and an inner space of the cavity.

As described above, the console cover 300 is further provided above the hinge part adiabatic member 470 to lead to complete heat insulation.

Figure 5:
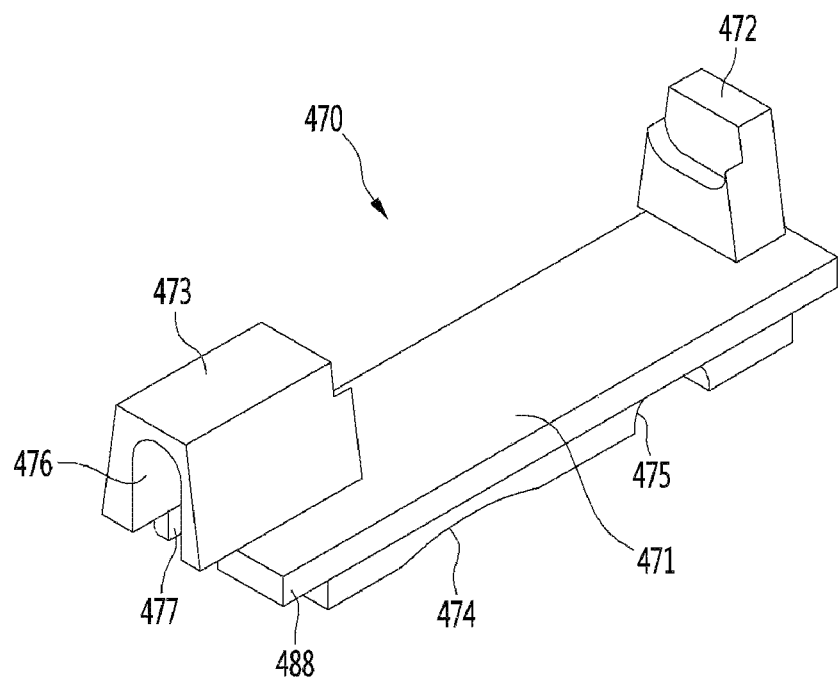
FIG. 5 is a perspective view of a hinge part adiabatic member.
Figure 6:
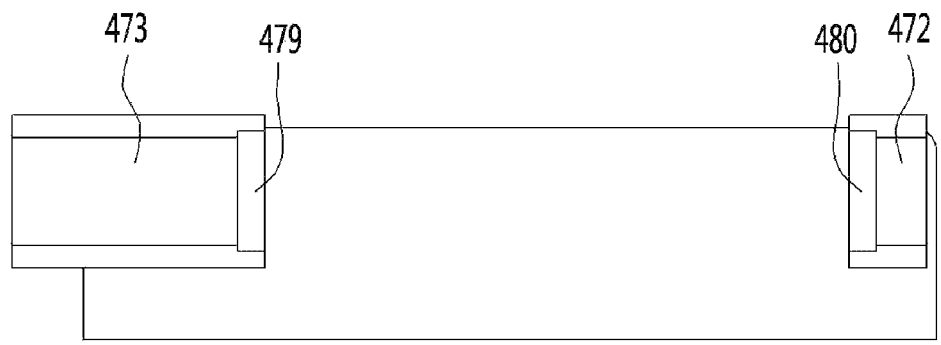
FIGS. 6 to 9 are plan, front, bottom, and left views of the hinge part adiabatic member.
Figure 7:
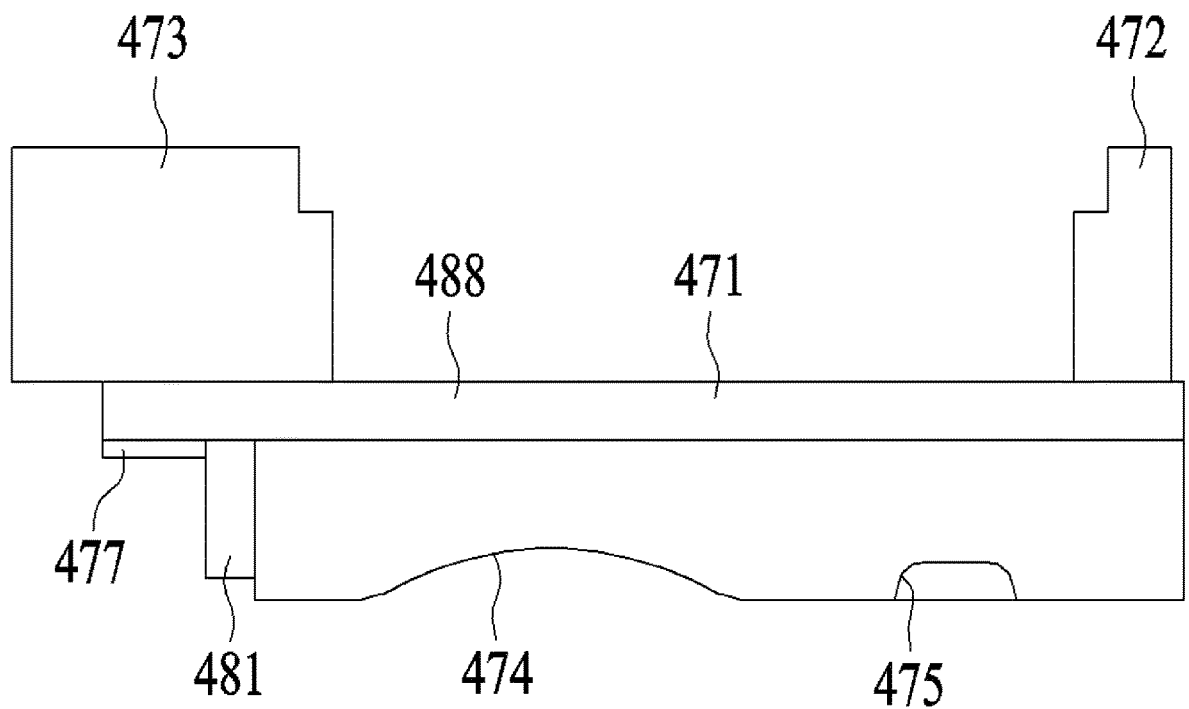
Figure 8:
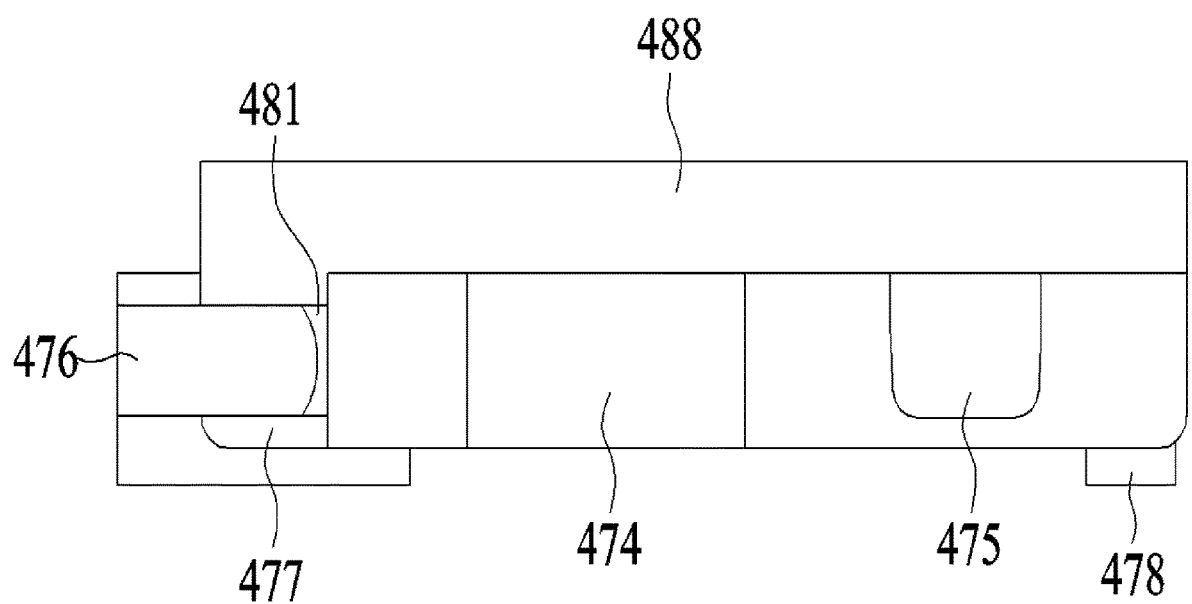
Figure 9:
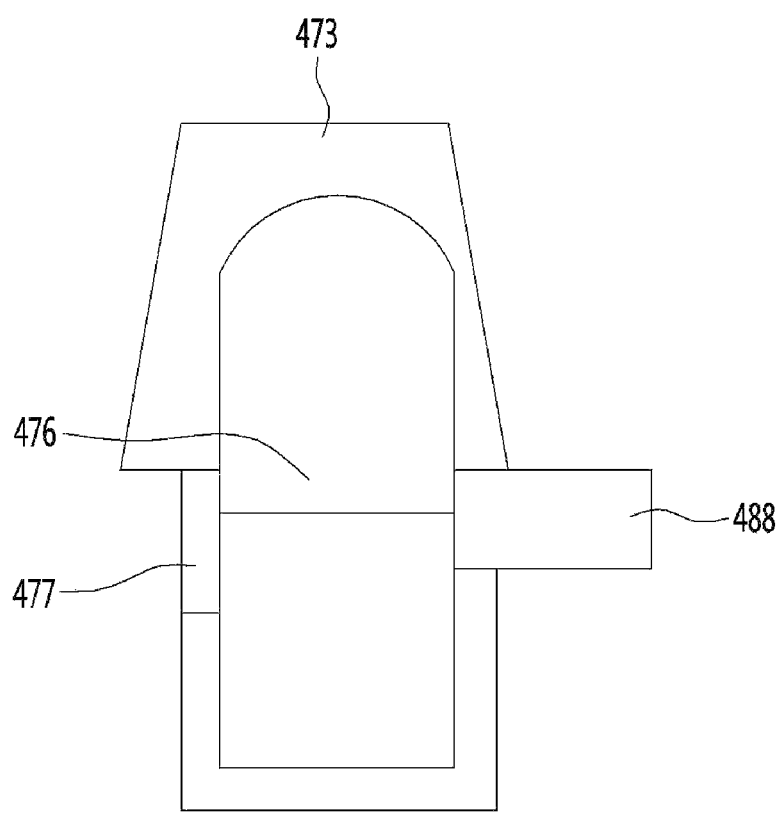

FIG. 5 is a perspective view of the hinge part adiabatic member.

Referring to FIG. 5, the hinge part adiabatic member 470 includes an inner support 473 covering the regeneration adiabatic member 651 and inserted into an inner bearing part or an inner bearing 373, an outer support 472 inserted into an outer bearing part or an outer bearing 372, and a connection bar 471 connecting the supports 472 and 473 to each other and thermally insulating an upper portion of the evaporation module 400.

Since the supports 472 and 473 are inserted into the bearing parts 372 and 373, the hinge part adiabatic member 470 and the console cover 300 may be integrated with each other. Also, since the console cover 300 is installed, the hinge part adiabatic member 470 may be fixed to a predetermined position with respect to the cavity 100. That is to say, the supports 472 and 473 may allow the parts in a rear space within the cavity 100 to come into close contact with each other while supporting the evaporation module 400. Thus, the parts may come into strong contact with each other to prevent the cold air from leaking. Also, a hinge action of the door 800 may be more secured.

Each of the supports 472 and 473 may have a structure that gradually decreases in cross-sectional area toward an end or side thereof so that the supports 472 and 473 are inserted into the bearing parts 372 and 373.

The inner support 473 may have a thickness greater than that of the outer support 472. This is because the inner support 473 is a portion surrounding the regeneration adiabatic member 651 to cause a heat loss.

A regeneration adiabatic member seating part or a seating insert 476 having a shape accurately matches an outer appearance or shape of the regeneration adiabatic member 651 is provided on an inner surface of the inner support 473. Thus, the inner support 473 may be curved in a smooth arc shape. A lower end surface of the regeneration adiabatic member seating part 476 may be placed on an upper end of the vacuum adiabatic body 101. Thus, a vertical position relationship between the hinge part adiabatic member 470 and the cavity 100 may be clear, and a gap between the parts may not occur.

An inner fitting part or an inner seal 477 further extending downward from a rear portion of the regeneration adiabatic member seating part 476 may be further provided. The inner fitting part 477 may correspond to an inner surface of the vacuum adiabatic body 101, and thus, the position relationship in a front and rear direction of the hinge part adiabatic member 470 may be more clearly fixed. An outer fitting part or an outer seal 478 corresponding to the inner fitting part 477 may also be provided on the outer support 472.

A part on which the evaporation module 400 is seated to be fitted is provided on the connection bar 471. Particularly, a cover seating part 488, a fan housing seating part 474, and a second compartment seating part 475 may be provided. The position relationship in a left and right direction with respect to the cavity of the hinge part adiabatic member 470 may be cleared by the cover seating part 488. Each of the fan housing seating part 474 and the second compartment seating part 475 is provided corresponding to an upper shape of the evaporation module 400 to prevent the cold air from leaking through the contact part between the evaporation module 400 and the hinge part adiabatic member 470.

According to the above-described constituents, leakage of external air through a boundary with the contact parts or various constituents coming into contact with the hinge part adiabatic member 470 may be prevented to enhance the adiabatic performance with respect to the portion that is vulnerable to heat leakage.

FIGS. 6 to 9 are plan, front, bottom, and left views of the hinge part adiabatic member.

Referring to FIGS. 6 to 9, the configuration of the hinge part adiabatic member 470 and an action of each constituent may be more clearly understood.

An outer fitting groove 480 and an inner fitting groove 479 are defined in inner portions of the supports 472 and 473, respectively. The fitting groove 479 may be configured to accommodate a support portion of the console cover 300 in which each of the bearing parts 372 and 373 is thicker to accommodate the hinge shaft or hinge pings of the door 800.

The second compartment seating part 475 may have a recessed structure and provide a path through which a structure such as a wire that is led out of the evaporation module 400 passes to the outside.

A skirt 481 further extends downward to an inside of the regeneration adiabatic member seating part 476. The skirt 481 may be a portion that further extends downward to help the perforation of the regeneration adiabatic member 651 that enters into the cavity 100.

Figure 10:
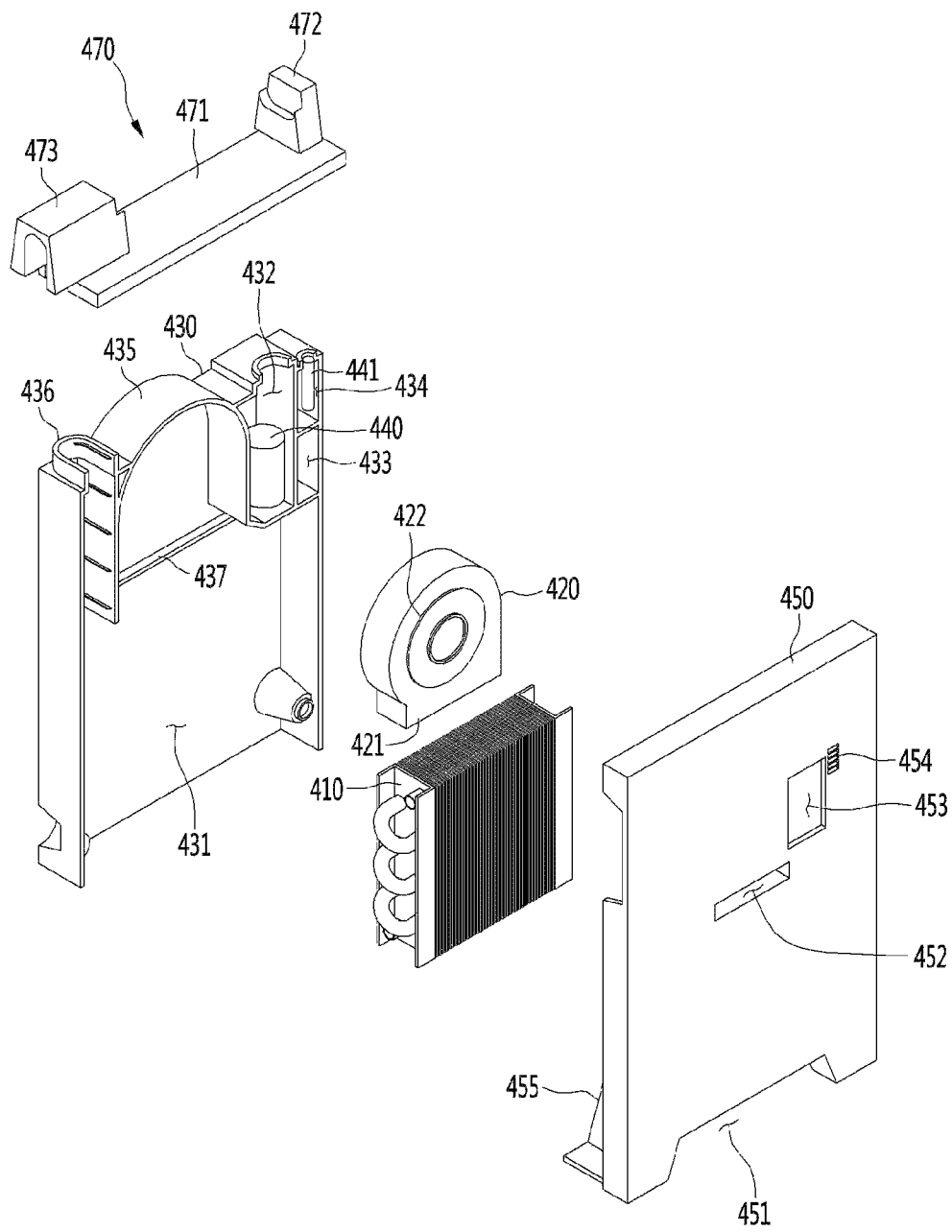
FIG. 10 is an exploded perspective view of an evaporation module.

FIG. 10 is an exploded perspective view of the evaporation module.

Referring to FIG. 10, the evaporation module 400 includes a rear cover 430 provided at a rear side to accommodate the parts and a front cover 450 provided at a front side of the rear cover 430 to face the cavity 100. A space may be provided in the evaporation module 400 by the front cover 450 and the rear cover 430 to accommodate the parts in the space.

In the space defined by the front cover 450 and the rear cover 430, an evaporator 410 is disposed at a lower side, and an evaporation fan 420 is disposed at an upper side. A centrifugal fan that is capable of being mounted in a narrow space may be used as the evaporation fan 420. More particularly, a sirocco fan including a fan inlet 422 having a large area to suction air and a fan outlet 421 blowing the air at a high rate in a predetermined discharge direction in a narrow space may be used as the evaporation fan 420.

The air passing through the evaporator 410 is suctioned into the fan inlet 422, and the air discharged from the fan outlet 421 is discharged to the cavity 100. For this, a predetermined space may be provided between the evaporation fan 420 and the rear cover 430.

A plurality of compartments may be provided in the rear cover 430 to accommodate the parts. Particularly, the evaporator 410 and the evaporation fan 420 are disposed in a first compartment 431 to guide a flow of cool air. A lamp or a light source 440 may be disposed in a second compartment to brighten the inside of the cavity 100 so that the user looks at or views the inside of the cavity 100. A temperature sensor 441 is disposed in a fourth compartment 434 to measure an inner temperature of the cavity 100 and thereby to control a temperature of the vehicle refrigerator 7.

When the temperature sensor 441 disposed in the fourth compartment 434 measures the inner temperature of the cavity 100, the air flow in the cavity 100 may not have a direct influence on the temperature sensor 441. That is, the cold air of the evaporator 410 may not have a direct influence on a third compartment 433.

Although the third compartment 433 is removed in some cases, the third compartment 433 may be provided to prevent an error of the inner temperature of the cavity 100 from occurring by conductive heat.

The fourth compartment 434 and the temperature sensor 441 are disposed at a right upper end of the evaporation module 400, which is farthest from the evaporator 410. This is to prevent the cold air from having an influence on the evaporator 410. That is to say, to prevent the cold air of the evaporator from having a direct influence on the fourth compartment 434 through the conduction, the fourth compartment 434 and the temperature sensor 441 may be isolated from the first compartment 431 by other compartments 432 and 433.

An inner structure of the first compartment 431 will be described in detail. A fan housing 435 on which the evaporation fan 420 is disposed is provided at an upper side, and an evaporator placing part 437 on which the evaporator 410 is placed is provided at a lower side.

A conduit passage 436 is provided in a left side of the fan housing 435. The conduit passage 436 may be a portion through which a refrigerant conduit 600 passing over the vacuum adiabatic body 101 is guided into the evaporation module 400 and be provided in a left corner portion of the evaporation module 400. The refrigerant conduit 600 may include two conduits that are surrounded by the refrigerant adiabatic member 651 so that the two conduits through which the evaporation module 400 is inserted and withdrawn are heat-exchanged with each other. Thus, the conduit passage 436 may have a predetermined volume. The conduit passage 436 may vertically extend from a left side of the evaporation module 400 to improve space density inside the evaporation module 400.

As described above, the evaporator 410 and the evaporation fan 420 are provided in the rear cover 430 to perform the cooling of air within the cavity and the circulation of air within the cavity.

The front cover 450 has an approximately rectangular shape like the rear cover 430. A cold air inflow hole 451 guiding the air inflow to the lower side of the evaporator 410 and a cold air discharge hole 452 aligned with the fan outlet 421 is defined in a lower portion of the front cover 450. The cold air discharge hole 452 may have a shape of which an inner surface is smoothly bent to discharge air, which is discharged downward from the evaporation fan 420, forward.

The front cover 450 aligned with the second compartment 432 may be opened, or a window 453 may be provided on the portion of the front cover 450 so that light of the lamp 440 is irradiated into the cavity 100.

An air vent hole 454 is defined in the front cover 450 aligned with the fourth compartment 434. The air discharged from the cold air discharge hole 452 circulates inside the cavity 100 and then is introduced into the air vent hole 454. Thus, the inner temperature of the cavity 100 may be more accurately detected. For example, the inner temperature of the cavity 100 may be erroneously measured by a large amount of cold air discharged from the cold air discharge hole 452.

Figure 11:
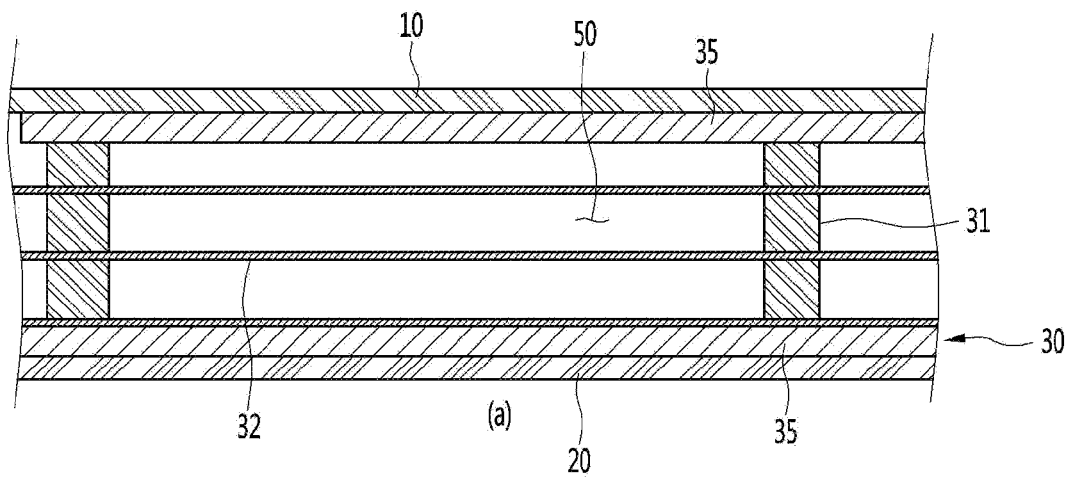
FIG. 11 is a view illustrating an internal configuration of a vacuum adiabatic body according to various embodiments.
Figure 11:
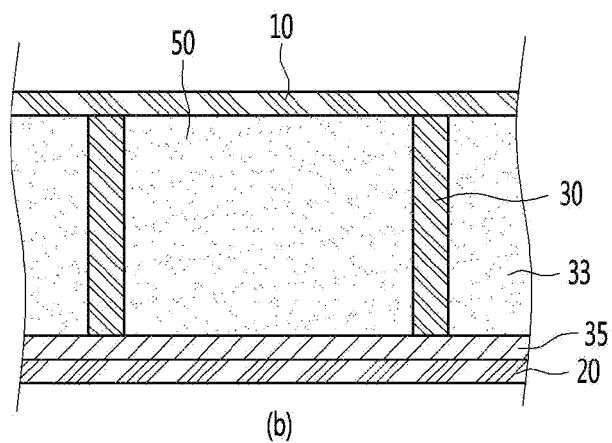
Figure 11:
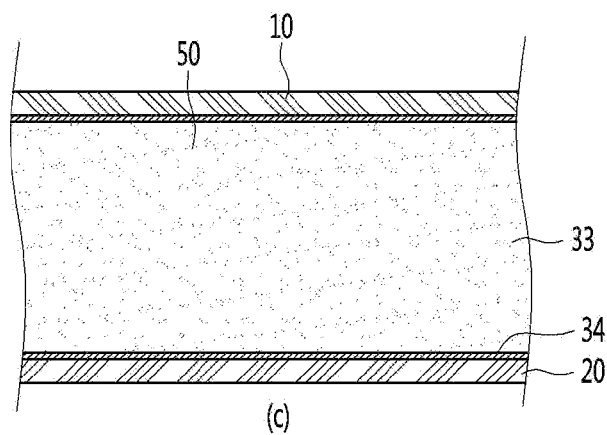

FIG. 11 is a view illustrating an internal configuration of a vacuum adiabatic body according to various embodiments.

First, referring to FIG. 11*a*, a vacuum space part 50 is provided in a third space having a different pressure from first and second spaces, preferably, a vacuum state, thereby reducing adiabatic loss. The third space may be provided at a temperature between the temperature of the first space and the temperature of the second space.

The third space is provided as a space in the vacuum state. Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 may include a resin selected from the group consisting of polycarbonate (PC), glass fiber PC, low outgassing PC, polyphenylene sulfide (PPS), and liquid crystal polymer (LCP) so as to obtain high compressive strength, low outgassing and water absorption, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members 10 and 20, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, at least one sheet of radiation resistance sheet 32 may be provided at a certain distance so as not to contact each other. At least one radiation resistance sheet 32 may be provided in a state in which it contacts the inner surface of the first or second plate member 10 or 20. Even when the vacuum space part 50 has a low height, one sheet of radiation resistance 32 sheet may be inserted. In case of the vehicle refrigerator 7, one sheet of radiation resistance sheet 32 may be inserted so that the vacuum adiabatic body 101 has a thin thickness, and the inner capacity of the cavity 100 is secured.

Referring to FIG. 11b, the distance between the plate members 10 and 20 is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body 101 may be fabricated without using the radiation resistance sheet 32.

Referring to FIG. 11c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body may be fabricated without using the supporting unit 30. In other words, the porous substance 33 may simultaneously serve as the radiation resistance sheet 32 and the supporting unit 30.

Figure 12:
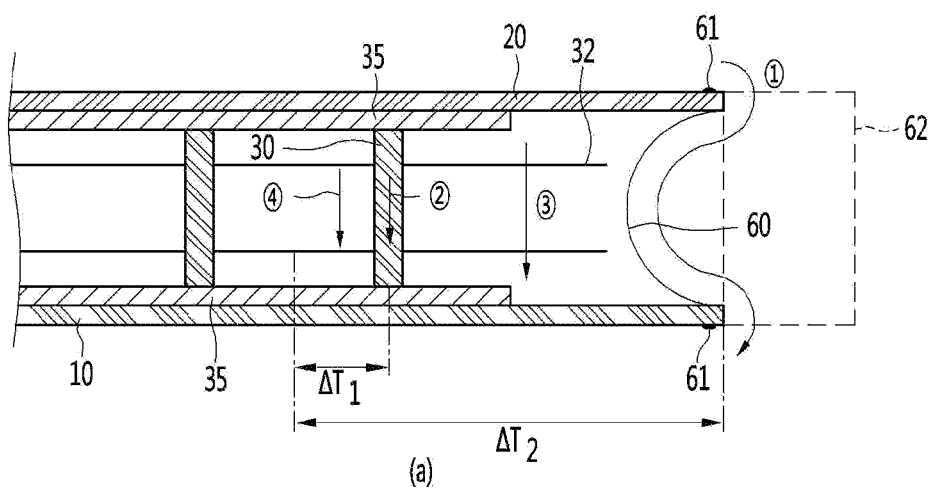
FIG. 12 is a view of a conductive resistance sheet and a peripheral portion of the conductive resistance sheet.
Figure 12:
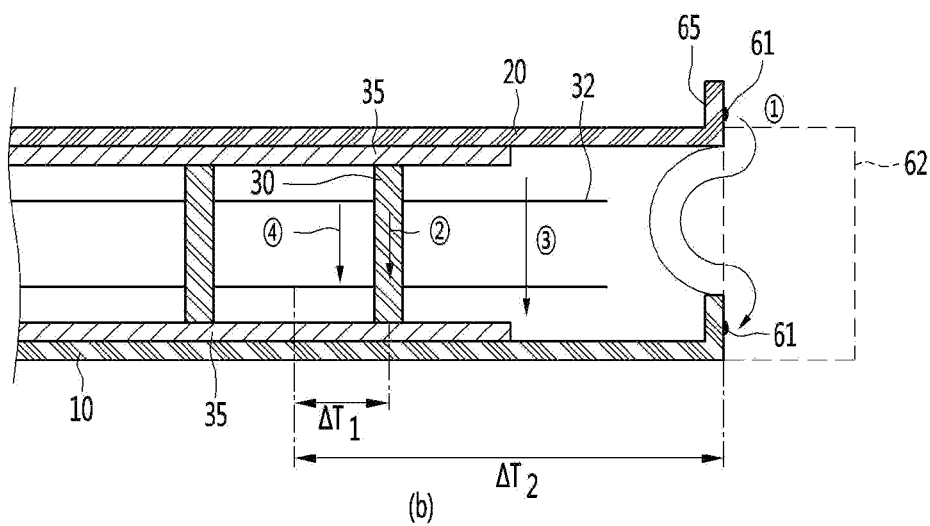

FIG. 12 is a view of a conductive resistance sheet and a peripheral portion of the conductive resistance sheet.

Referring to FIG. 12a, the first and second plate members 10 and 20 are to be sealed so as to vacuum the interior of the vacuum adiabatic body 101. In this case, since the two plate members 10 and 20 have different temperatures from each other, heat transfer may occur between the two plate members 10 and 20. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the vehicle refrigerator 7, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance 33 contacting an outer surface of the conductive resistance sheet 60, may be provided as an adiabatic structure, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described. Heat passing through the vacuum adiabatic body may be divided into surface conduction heat ① conducted along a surface of the vacuum adiabatic body 101, more specifically, the conductive resistance sheet 60, supporter conduction heat ②conducted along the supporting unit 30 provided inside the vacuum adiabatic body 101, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the plate members 10 and 20 may be changed, and the length of the conductive resistance sheet 60 may be changed. The transfer heat may be changed depending on a difference in temperature between the spaces (the first and second spaces) respectively provided by the plate members 10 and 20. In the embodiment, a preferred configuration of the vacuum adiabatic body 101 has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as about 19.6 mW/mK.

By performing a relative analysis on heat transfer amounts of the vacuum adiabatic body 101 of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math FIG. 1.

$$eK_{solid\ conduction\ heat} >$$
$$eK_{radiation\ transfer\ heat} > eK_{gas\ conduction\ heat}$$

[Math Figure 1]

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (ek) of the entire vacuum adiabatic body 101 is a value given by k=QL/AΔT. Here, Q denotes a calorific value (W) and may be obtained using a calorific value of a heater. A denotes a sectional area (m2) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60, a sectional area (A) of the conductive resistance sheet, a length (L) of the conductive resistance sheet, and a thermal conductivity (k) of the conductive resistance sheet 60 (the thermal conductivity of the conductive resistance sheet 60 is a material property of a material and may be obtained in advance). For the supporter conduction heat, a conductive calorific value may be obtained through a temperature difference (ΔT) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance 33 is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance 33.

In the second plate member 20, a temperature difference between an average temperature of the second plate 20 and a temperature at a point at which a heat transfer path passing through the conductive resistance sheet 60 meets the second plate 20 may be largest. For example, when the second space is a region hotter than the first space, the temperature at the point at which the heat transfer path passing through the conductive resistance sheet meets the second plate member 20 becomes lowest. Similarly, when the second space is a region colder than the first space, the temperature at the point at which the heat transfer path passing through the conductive resistance sheet 60 meets the second plate member 20 becomes highest.

This means that the amount of heat transferred through other points except the surface conduction heat passing through the conductive resistance sheet should be controlled, and the entire heat transfer amount satisfying the vacuum adiabatic body 101 may be achieved only when the surface conduction heat occupies the largest heat transfer amount. To this end, a temperature variation of the conductive resistance sheet 60 may be controlled to be larger than that of the plate member 20.

Physical characteristics of the parts constituting the vacuum adiabatic body 101 will be described. In the vacuum adiabatic body 101, a force by vacuum pressure is applied to all of the parts. Therefore, a material having strength (N/m2) of a certain level may be used.

Referring to FIG. 12b, this configuration is the same as that of FIG. 12a except that portions at which the first plate member 10, the second plate member 20 are coupled to the conductive resistance sheet 60. Thus, the same part omits the description and only the characteristic changes are described in detail.

Ends of the plate members 10 and 20 may be bent to the second space having a high temperature to form a flange part 65. A welding part 61 may be provided on a top surface of the flange part 65 to couple the conductive resistance sheet 60 to the flange part 65. In this embodiment, the worker may perform welding while facing only any one surface. Thus, since it is unnecessary to perform two processes, the process may be convenient.

It is more preferable to apply the case in which welding of the inside and the outside are difficult as illustrated in FIG. 12a because a space of the vacuum space part 50 is narrow like the vehicle refrigerator 7.

Figure 13:
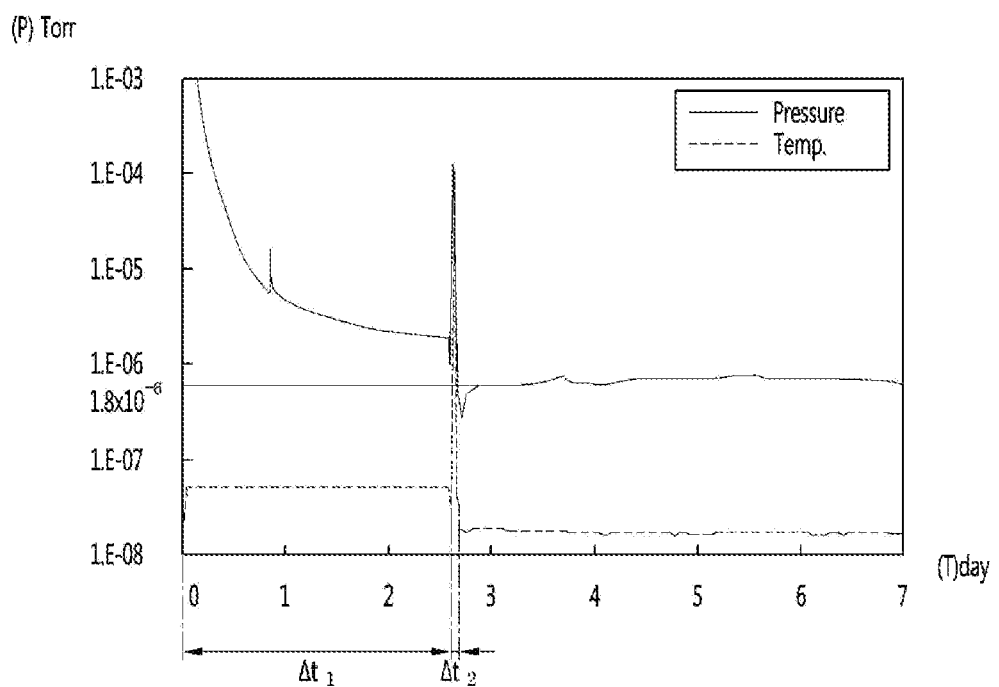
FIG. 13 is a graph illustrating results obtained by observing a time and a pressure in a process of exhausting the inside of the vacuum adiabatic body when a supporting unit is used.

FIG. 13 is a graph illustrating results obtained by observing a time and a pressure in a process of exhausting the inside of the vacuum adiabatic body 101 when a supporting unit 30 is used.

Referring to FIG. 13, in order to create the vacuum space part 50 to be in the vacuum state, a gas in the vacuum space part 50 is exhausted by a vacuum pump while evaporating a latent gas remaining in the parts of the vacuum space part 50 through heating. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body 101, thereby setting the minimum internal pressure of the vacuum space part 50 to $1.8 \times 10^{-6}$ Torr.

Figure 14:
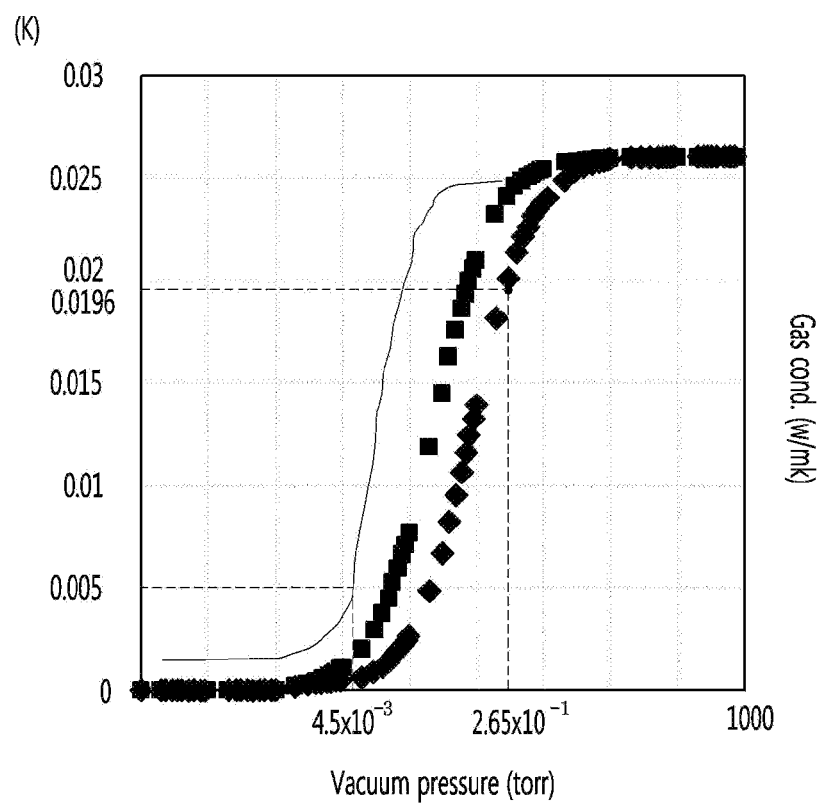
FIG. 14 is a graph illustrating results obtained by comparing a vacuum pressure with gas conductivity.

FIG. 14 is a graph obtained by comparing a vacuum pressure with gas conductivity.

Referring to FIG. 14, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member 10 or 20 adjacent thereto. When the radiation resistance sheet 32 does not exist inside vacuum space part 50, the gap is a distance between the first and second plate members 10 and 20.

It may be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it may be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit 30 but provided with the porous substance 33, the size of the gap ranges from a few micrometers to a few hundreds of micrometers. In this case, the amount of radiation heat transfer is small due to the porous substance 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit 30 and the porous substance 33 are provided together in the vacuum space part, a vacuum pressure may be created and used, which is middle pressure between the vacuum pressure when only the supporting unit 30 is used and the vacuum pressure when only the porous substance 33 is used.

According to the embodiments, the vehicle refrigerator 7 that receives only power from the outside and is independent apparatus may be efficiently realized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A refrigerator comprising:
a cavity having an opening to accommodate a product;
a door opening and closing the opening of the cavity;
a conduit connecting between an inner space of the cavity and an outer space of the cavity; and
a hinge support supporting a hinge shaft of the door,
wherein a portion of the cavity is formed by a vacuum adiabatic body, the vacuum adiabatic body including: a first plate; a second plate; and a vacuum space provided between the first plate and the second plate, and
wherein the hinge support includes a path through which the conduit passes.

2. The refrigerator according to claim 1, wherein the hinge support includes a seating insert where the conduit is disposed.

3. The refrigerator according to claim 1, wherein the hinge support includes a support to support the hinge shaft of the door.

4. The refrigerator according to claim 1, wherein the hinge support is disposed outside the vacuum space, and includes a portion to be fixed to a surface of the cavity.

5. The refrigerator according to claim 1, wherein the hinge support is disposed in an outer space of the vacuum adiabatic body, and includes a portion to be fixed to a surface of the cavity.

6. The refrigerator according to claim 1, comprising a supporting unit provided to reduce the deformation of the vacuum space, and wherein the hinge support is spaced apart from the supporting unit, and includes a portion to be fixed to a surface of the cavity.

7. The refrigerator according to claim 1, comprising a radiation resistance sheet for reducing heat radiation between the first plate and the second plate, and wherein the hinge support is spaced apart from the radiation resistance sheet, and includes a portion to be fixed to a surface of the cavity.

8. The refrigerator according to claim 1, comprising a conductive resistance sheet blocking heat transfer between the first plate and the second plate, and wherein the hinge support is spaced apart from the conductive resistance sheet, and includes a portion to be fixed to a surface of the cavity.

9. The refrigerator according to claim 1, comprising a conductive resistance sheet blocking heat transfer between the first plate and the second plate, and wherein the conductive resistance sheet includes a portion provided at an surface of the cavity.

10. The refrigerator according to claim 1, comprising a conductive resistance sheet blocking heat transfer between the first plate and the second plate, and wherein the conductive resistance sheet includes a portion provided between the cavity and the door.

11. A refrigerator comprising:
a cavity having an opening to accommodate a product;
a door opening and closing the opening of the cavity;
a conduit connecting between an inner space of the cavity and an outer space of the cavity;
an adiabatic body surrounding the conduit, and
a hinge support supporting a hinge shaft of the door,
wherein a portion of the cavity is formed by a vacuum adiabatic body, the vacuum adiabatic body including: a first plate; a second plate; and a vacuum space provided between the first plate and the second plate, and
wherein the hinge support includes a path through which the adiabatic body passes.

12. The refrigerator according to claim 11, wherein the conduit includes a first conduit and a second conduit heat-exchanged with the first conduit.

13. The refrigerator according to claim 11, wherein the adiabatic body is a regeneration adiabatic body.

14. The refrigerator according to claim 11, wherein the hinge support includes a seating insert where the adiabatic body is disposed.

15. The refrigerator according to claim 11, wherein the hinge support includes a portion to correspond to a surface of the cavity.

16. The refrigerator according to claim 15, wherein the portion is a fitting part to be fixed to a surface of the cavity.

17. The refrigerator according to claim 11, wherein the hinge support includes a support to support the hinge shaft of the door.

* * * * *